United States Patent Office 2,854,312
Patented Sept. 30, 1958

2,854,312

PREPARATION OF ALUMINUM BOROHYDRIDE

James B. Hinkamp, Birmingham, Mich., assignor to Ethyl Corporation, New York, N. Y., a corporation of Delaware No Drawing. Application July 31, 1952
Serial No. 301,975

6 Claims. (Cl. 23—14)

The present invention relates to the preparation of aluminum borohydride, and more particularly to an improved method of preparing this compound from an aluminum halide and an alkali metal borohydride.

Aluminum borohydride is known to have been prepared from trimethyl aluminum and diborane. This method, however, is primarily suitable only for laboratory preparation in that the reagents are difficult to prepare and the reaction is very sensitive and requires considerable skill on the part of the operator. For this reason this method is not suitable for commercial operation. A process which offers considerable promise from the standpoint of commercial manufacture of aluminum borohydride comprises reacting an alkali metal borohydride with an aluminum halide. This reaction is carried out by co-mingling the reactants in a form of a solid powder accompanied by a vigorous stirring or agitation. The most suitable apparatus for operating on a commercial scale consists of a reaction vessel provided with a rotatable shaft to which is secured a series of stirring arms or shoes. Considerable difficulty, however, has been encountered in carrying out this reaction using such apparatus. For example, the reagents tend to cake beneath the stirring arms and around the shaft, and frequently the shaft becomes completely frozen, thus making it necessary to disassemble the apparatus for cleaning and repair. The reagents are also quite abrasive and frequently cause rapid deterioration of the bearings supporting the stirrer shaft. In addition to these difficulties, the highly abrasive character of the reactants cause overall excessive wear. Another problem encountered is that the stirring action tends to produce a large quantity of finely divided solid material which tends to be carried over with the product vapors into the recovery system so as to cause plugging of the passageway and contamination of the product. All of these difficulties necessarily add to the cost and render the process commercially unattractive.

Accordingly, it is an object of my invention to overcome the above disadvantages of the prior art and provide a new and improved process of preparing aluminum borohydride. A further object of my invention is to provide an improved process for preparing aluminum borohydride from aluminum halide and an alkali metal borohydride. These and other objects of my invention will become apparent from the following description.

The above and other objects of my invention are accomplished by conducting the reaction between the aluminum halide and alkali metal borohydride in the presence of an inert liquid medium possessing lubricant properties. When carrying out the preparation ni accordance with my invention, the abrasive character of the reactants is completely eliminated so as to not only increase the life of the apparatus, but substantially decrease the amount of cleaning and repairing which have heretofore been necessary. The use of the inert liquid material also prevents the reactants from being carried over by the product vapors into the recovery system, thus eliminating plugging of the passageways and contamination of the product. Another embodiment of my invention consists of carrying out the reaction in the presence of the liquid using minor amounts of graphite. Although use of the inert liquid alone is generally sufficient to accomplish the stated objects, I have found that when minor amounts of graphite are also included in the reaction mixture, the effect of the inert liquid is somewhat enhanced.

Although the particular characteristics of the liquid I employ in my invention are not especially critical, they are important. For example, the liquid which I employ must be inert to the reactants up to temperatures of about 150° C. It is also preferable that the liquid have a relatively low vapor pressure since the reaction is best carried out under vacuum. Normally a vapor pressure not in excess of 5 mm. Hg at 150° C. is sufficient although liquids having somewhat higher vapor pressures can be employed. In such case, however, in order to prevent the liquid from being completely removed from the reaction mixture, a reflux condenser should be employed. It is preferred, however, that the liquid have a vapor pressure less than 0.2 mm. Hg at 20° C. and less than 2.0 mm. Hg at 120° C. The viscosity may vary over a wide range, although it generally is preferred to use a liquid having a viscosity between 10 to 1000 centistokes at 20° C. A number of liquid materials will meet the above requirements. For example, conventional hydrocarbon lubricating oils such as refined paraffinic and naphthenic oils which do not contain additives which will react can be used. Similarly, synthetic lubricants such as silicon oils, olefin polymers, and the like can also be employed. It is preferred, however, to utilize refined mineral oil, frequently referred to as white mineral oil. This material does not contain additives and, in general, is admirably suited for use in my invention.

Similarly, the amount of liquid used is not particularly critical, although I have found that it is preferred to use an amount equivalent to between one-third and two-thirds the volume of the dry reactants. When graphite is also included in the reaction mixture in accordance with one embodiment of my invention, the amount of graphite used is small and generally need not exceed more than 15 percent by weight of the dry reactants. Good results are obtained using as little as 5 percent by weight based on the weight of the dry reactants.

One method of carrying out the reaction consists of using a reaction vessel equipped with a stirring mechanism. Since the reactants are extremely sensitive to atmospheric oxidation and hydrolysis, care should be exercised in excluding air from the system. It is therefore preferred to provide means for charging the reagents to the reaction vessel in an inert atmosphere such as dry nitrogen. Means should also be provided for heating and cooling the reaction vessel. The product evolves from the reaction mixture as a vapor, and therefore the recovery system generally consists of a series of cold traps, the first of which is maintained at a temperature of about −80° C. so as to condense substantially all of the aluminum borohydride product. One or two additional traps are normally included, these traps being maintained at about −200° C. so as to condense the byproduct diborane along with any product entrained therein. The vacuum in the reaction vessel is established by use of a vacuum pump connected thereto through the product recovery system.

One procedure for carrying out the reaction comprises initially flushing the apparatus with nitrogen, and while maintaining the nitrogen atmosphere in the vessel, charging the reactants. The reaction vessel is then sealed and evacuated to about 0.2 mm. Hg. Although the reaction to form the aluminum borohydride is initiated at about room temperature, it is preferable to progressively heat the mixture to about 150° C. over a period of 5 to 7 hours. The addition of heat should be controlled so that the pressure within the reaction vessel does not exceed about 3.0 mm. Hg. At a temperature of 150° C. the reaction is substantially complete, and the end point can be determined by the absence of evolution of vapors from the mixture.

The following examples, in which the parts given are on a weight basis, will serve to further illustrate my invention.

*Example I*

The apparatus employed consisted of a reaction vessel provided with a mechanical stirrer and means for admitting nitrogen. The product recovery system consisted of three cold traps in series, the first of which was maintained at −80° C., and the second and third at −196° C. Means for establishing a vacuum in the system consisted of a vacuum pump communicating with a reaction vessel through the product recovery system. One hundred twenty parts of sodium borohydride and 192 parts of aluminum chloride powder were charged to the vessel along with 355 parts of white mineral oil. The vessel was then evacuated to a pressure of about 0.3 mm. Hg and slowly heated to a temperature of 142° C. The rate of heating was such that the vessel was brought up to this temperature over a period of five hours, and during this period, the pressure did not exceed 2.7 mm. Hg. At the end of this time the reaction was substantially complete, and a yield of aluminum borohydride equivalent to 71.5 percent theoretical was obtained. The apparatus operated smoothly throughout the run with no appreciable abrasion taking place within the reaction vessel. Similarly, none of the reactants were carried over into the recovery system, and no plugging or fouling of the lines was encountered, nor was the product contaminated by reactants.

*Example II*

Using an apparatus identical to that described in Example I, 120 parts of sodium borohydride and 192 parts of aluminum chloride were charged to the reaction vessel along with 16 parts graphite and 355 parts of white mineral oil. An initial pressure of 0.5 mm. Hg was established in the vessel, and the reactants were then progressively heated to 145° C. over a period of six hours, during which time the pressure did not exceed 3.2 mm. Hg. A yield of aluminum borohydride equivalent to 69 percent of theoretical was obtained, and as in Example I, no difficulties were encountered during the run in the way of shaft freezeups, line plugs, or contaminated product.

*Example III*

The apparatus used was identical to that described in Example I above. In this instance 160 parts sodium borohydride and 228 parts aluminum chloride were charged to the reaction vessel along with 30 parts graphite and 355 parts of white mineral oil. After establishing a vacuum of 0.3 mm. Hg in the vessel the temperature was gradually raised to 143° C., the total elapsed time being seven hours. During this period, the pressure did not exceed 1.5 mm. Hg. Aluminum borohydride was recovered in approximately 66 percent yield, and as in the above examples, no difficulties were encountered during the run.

The above examples thus merely illustrate specific embodiments of my invention, and in carrying out the reaction, any alkali metal borohydride can be similarly employed. Although sodium borohydride is preferred since it is more easily prepared, lithium borohydride will react readily with an aluminum halide to produce somewhat higher yields of aluminum borohydride. Potassium borohydride or any other alkali metal borohydride can also be used in place of the sodium borohydride of the above examples. Similarly, aluminum bromide can be used in place of aluminum chloride, although the yield will be somewhat reduced. Stoichiometric amounts of the reactants are normally employed, although good results are obtained using as much as 50 percent excess aluminum halide.

As previously indicated, although white mineral oil is the preferred inert liquid to be used in accordance with my invention, equally good results are obtained using other materials, such as silicone oil, refined naphthenic oil, and the like.

It can thus be seen that by my invention I have provided a novel and improved process for preparing aluminum borohydride. When operating in accordance with my invention, the difficulties heretofore experienced in carrying out the reaction are eliminated, and a commercially suitable process results. It is to be understood that the above examples are given only by way of illustrating specific embodiments, and I intend by the appended claims to cover all modifications within the spirit and scope of my invention.

I claim:

1. A process for preparing aluminum borohydride, comprising reacting aluminum chloride and sodium borohydride in the presence of white mineral oil and a minor amount of graphite.

2. A process for preparing aluminum borohydride, comprising reacting an aluminum halide with an alkali metal borohydride in the presence of an organic liquid substantially inert to said aluminum halide, alkali metal borohydride, and aluminum borohydride, and up to about 15% graphite based on the weight of the total solids present, said liquid possessing lubricant properties and having a viscosity at 20° C. from about 10 to 1,000 centistokes.

3. A process for preparing aluminum borohydride, comprising reacting an aluminum halide with an alkali metal borohydride in the presence of an organic liquid substantially inert to said aluminum halide, alkali metal borohydride, and aluminum borohydride, said liquid possessing lubricant properties and having a viscosity at 20° C. from about 10 to 1,000 centistokes, the amount of said liquid being about one-half to two-thirds the volume of the total solids present, and in the further presence of about 5 to 15% of graphite based on the total weight of solids present.

4. A process for preparing aluminum borohydride, comprising reacting an aluminum halide with an alkali metal borohydride in the presence of a hydrocarbon oil of mineral origin, substantially inert to said aluminum halide, alkali metal borohydride, and aluminum borohydride, wherein a minor amount of graphite is present in the reaction mixture, said oil having a viscosity at 20° C. from about 10 to 1,000 centistokes.

5. A process for preparing aluminum borohydride comprising reacting an aluminum halide with an alkali metal borohydride in the presence of an organic liquid possessing lubricant properties and having a viscosity at 20° C. from about 10 to 1,000 centistokes, said liquid being substantially inert to said aluminum halide, alkali metal borohydride and aluminum borohydride, and wherein said liquid is present in amount equivalent to between about one-third and two-thirds the volume of the dry reactants.

6. A process as defined by claim 5 wherein the organic liquid is a hydrocarbon oil of mineral origin.

References Cited in the file of this patent

UNITED STATES PATENTS

| | | |
|---|---|---|
| 1,331,904 | Elder | Feb. 24, 1920 |
| 2,599,203 | Schlesinger | June 3, 1952 |
| 2,729,540 | Fisher | Jan. 3, 1956 |

OTHER REFERENCES

Finholt: Progress Report, Contract NOa(s)—9901, Bureau of Aeronautics, printed October 23, 1948, declassified March 19, 1956, 6 pages.

Schechter et al.: "Boron Hydrides and Related Compounds," prepared under Contract NOa(s)—10992 for Dept. of Navy, Bureau of Aeronautics, prepared by Callery Chemical Co., printed March 1951, declassified December 1953, page 41.